US012761620B2

(12) United States Patent
Lee et al.

(10) Patent No.: US 12,761,620 B2
(45) Date of Patent: Oct. 13, 2026

(54) HOME APPLIANCE, HOME APPLIANCE SYSTEM AND CONTROLLING METHOD THEREOF

(71) Applicant: Samsung Electronics Co., Ltd., Suwon-si (KR)

(72) Inventors: Jeawon Lee, Suwon-si (KR); Jeonghoon Kang, Suwon-si (KR); Nokhaeng Lee, Suwon-si (KR); Seunggee Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 18/453,699

(22) Filed: Aug. 22, 2023

(65) Prior Publication Data

US 2024/0019829 A1 Jan. 18, 2024

Related U.S. Application Data

(63) Continuation of application No. PCT/KR2023/008614, filed on Jun. 21, 2023.

(30) Foreign Application Priority Data

Jul. 14, 2022 (KR) ........................ 10-2022-0086685

(51) Int. Cl.
*G05B 19/042* (2006.01)
*H04L 12/28* (2006.01)

(52) U.S. Cl.
CPC .......... *G05B 19/042* (2013.01); *H04L 12/282* (2013.01); *G05B 2219/23238* (2013.01)

(58) Field of Classification Search
None
See application file for complete search history.

(56) References Cited

U.S. PATENT DOCUMENTS 8,081,765 B2 * 12/2011 Yu ............................ H04R 5/04 704/258
8,731,475 B1 * 5/2014 Youngs ................. H04W 4/029 455/220

(Continued)

FOREIGN PATENT DOCUMENTS

CN 105223818 A 1/2016
EP 1171988 B1 10/2011

(Continued)

OTHER PUBLICATIONS

International Search Report and Written Opinion of the International Searching Authority dated Sep. 26, 2023, in connection with International Application No. PCT/KR2023/008614, 10 pages.

(Continued)

*Primary Examiner* — Jason Lin

(57) ABSTRACT

A home appliance, a home appliance system, and a controlling method thereof are disclosed. The home appliance includes an input interface, a communication interface, a processor, and a motor, wherein the processor is configured to receive input of an instruction regarding whether to activate a noise control mode from a user through the input interface, receive notification information including at least one of a received call or a received message from a terminal device interlocked with the home appliance through the communication interface, and based on the noise control mode being in an inactivated state, ignore the notification information and maintain the driving speed of the motor.

20 Claims, 9 Drawing Sheets

(56) References Cited

U.S. PATENT DOCUMENTS

| | | | | |
|---|---|---|---|---|
| 8,797,465 | B2 * | 8/2014 | Hardacker | H04N 21/42209 348/734 |
| 9,427,863 | B2 | 8/2016 | Lee | |
| 11,019,972 | B2 | 6/2021 | Lee et al. | |
| 12,212,944 | B2 * | 1/2025 | Lee | H04R 1/1083 |
| 2008/0212820 | A1 * | 9/2008 | Park | H04M 1/6091 381/370 |
| 2010/0034395 | A1 * | 2/2010 | Lundin | H04M 19/044 381/57 |
| 2012/0020486 | A1 * | 1/2012 | Fried | H03G 3/32 381/105 |
| 2012/0045990 | A1 * | 2/2012 | Sandell | H04M 1/6066 455/575.2 |
| 2013/0072251 | A1 * | 3/2013 | Kim | H04M 1/72412 455/550.1 |
| 2014/0078404 | A1 * | 3/2014 | Cheung | H04N 21/42203 348/734 |
| 2015/0256399 | A1 | 9/2015 | Kim et al. | |
| 2016/0100265 | A1 * | 4/2016 | Maggiore | G06F 16/9535 381/56 |
| 2016/0103653 | A1 | 4/2016 | Jang | |
| 2016/0110155 | A1 * | 4/2016 | Ievgen | H04R 29/00 700/94 |
| 2016/0132046 | A1 * | 5/2016 | Beoughter | G06F 16/248 700/17 |
| 2016/0293180 | A1 * | 10/2016 | Ur | H04R 3/002 |
| 2017/0039025 | A1 * | 2/2017 | Kielak | G06F 3/165 |

FOREIGN PATENT DOCUMENTS

| | | | |
|---|---|---|---|
| JP | H08-123545 | A | 5/1996 |
| JP | 2020-107927 | A | 7/2020 |
| KR | 10-1998-0013192 | U | 6/1998 |
| KR | 10-2007-0046462 | A | 5/2007 |
| KR | 10-0767124 | B1 | 10/2007 |
| KR | 10-0777985 | B1 | 11/2007 |
| KR | 10-2008-0112193 | A | 12/2008 |
| KR | 10-2009-0030719 | A | 3/2009 |
| KR | 10-2009-0043154 | A | 5/2009 |
| KR | 10-2010-0008410 | A | 1/2010 |
| KR | 10-2014-0106872 | A | 9/2014 |
| KR | 10-2015-0103880 | A | 9/2015 |
| KR | 10-2017-0048815 | A | 5/2017 |
| KR | 10-2018-0016022 | A | 2/2018 |
| KR | 10-2018-0110978 | A | 10/2018 |
| KR | 10-1951328 | B1 | 4/2019 |
| KR | 10-2019-0117455 | A | 10/2019 |
| KR | 10-2054993 | B1 | 12/2019 |
| KR | 10-2104896 | B1 | 5/2020 |
| KR | 10-2233926 | B1 | 3/2021 |
| WO | 10-2007-081519 | A2 | 7/2007 |

OTHER PUBLICATIONS

Supplementary European Search Report dated Mar. 31, 2025, in connection with European Application No. 23839827.5, 10 pages.

* cited by examiner

HOME APPLIANCE, HOME APPLIANCE SYSTEM AND CONTROLLING METHOD THEREOF

CROSS-REFERENCE TO RELATED APPLICATIONS

This application is a by-pass continuation application of International Application No. PCT/KR2023/008614, filed on Jun. 21, 2023, which is based on and claims priority to Korean Patent Application No. 10-2022-0086685, filed on Jul. 14, 2022, in the Korean Intellectual Property Office, the disclosures of which are incorporated by reference herein their entireties.

BACKGROUND

1. Field

The disclosure relates to a home appliance, a home appliance system, and a controlling method thereof, and more particularly, to a home appliance that controls a driving mode in a state of being interlocked with a communication terminal device, a home appliance system, and a controlling method thereof.

2. Description of Related Art

As digital and network technologies have developed, recently, various home appliances are connected to other devices and provide convenience to users. For example, a home appliance is connected to a terminal device by using communication methods such as Wi-Fi, Bluetooth, etc., and a user can control the home appliance and monitor the state of the home appliance by using the terminal device.

Meanwhile, as technologies for home appliances have developed, low-noise home appliances have become commercialized. However, some home appliances generate big noises to a degree that ambient notification sounds are difficult to be recognized. For example, when a user uses a cleaner, the user cannot recognize a receipt notification sound of a terminal device in many cases. Also, even if the user recognized a receipt notification sound of a terminal device, the user has to stop the operation of the cleaner to have a conversation with the counterpart.

SUMMARY

The disclosure is for resolving the aforementioned problem, and the purpose of the disclosure is in providing a home appliance that automatically controls the driving of the motor to reduce noise based on a terminal device performing a notifying operation, a home appliance system, and a controlling method thereof. Embodiments of this disclose provide a solution to a need for a technology by which, when a terminal device performs a notifying operation, a home appliance can automatically control the driving of the motor by being interlocked with the terminal device, and can thereby reduce noise.

A home appliance according to an embodiment of the disclosure includes an input interface, a communication interface, a processor, and a motor, wherein the processor is configured to receive input of an instruction regarding whether to activate a noise control mode from a user through the input interface, receive notification information including at least one of a received call or a received message from a terminal device interlocked with the home appliance through the communication interface, and based on the noise control mode being in an inactivated state, ignore the notification information and maintain the driving speed of the motor.

A controlling method of a home appliance according to an embodiment of the disclosure includes the steps of receiving input of an instruction regarding whether to activate a noise control mode from a user, receiving notification information including at least one of a received call or a received message from a terminal device interlocked with the home appliance, and motor speed controlling of, based on the noise control mode being in an inactivated state, ignoring the notification information and maintaining the driving speed of the motor.

A home appliance system according to an embodiment of the disclosure includes a terminal device and a home appliance interlocked with the terminal device, and the terminal device is configured to, based on receiving notification information including at least one of a received call or a received message from an external device, transmit the received notification information to the home appliance, and the home appliance receives input of an instruction regarding whether to activate a noise control mode from a user, receive the notification information transmitted from the terminal device, and based on the noise control mode being in an inactivated state, ignore the notification information and maintain the driving speed of the motor.

A non-transitory computer readable storage medium having a program performing a controlling method of a home appliance recorded therein according to an embodiment of the disclosure performs a controlling method including the steps of receiving input of an instruction regarding whether to activate a noise control mode from a user, receiving notification information including at least one of a received call or a received message from a terminal device interlocked with the home appliance, and motor speed controlling of, based on the noise control mode being in an inactivated state, ignoring the notification information and maintaining the driving speed of the motor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
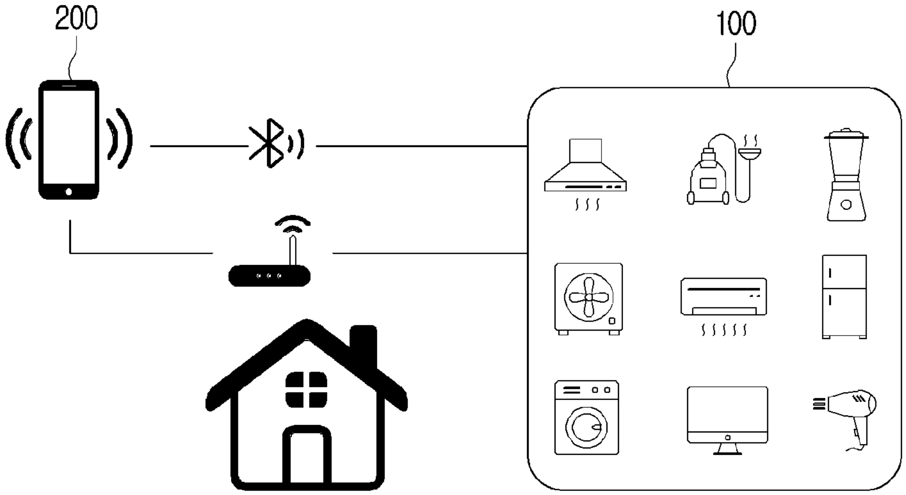
FIG. 1 is a diagram illustrating a home appliance system according to an embodiment of the disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments will be described in more detail with reference to the accompanying drawings. The embodiments described in this specification may be modified in various ways. Also, specific embodiments may be illustrated in the drawings, and described in detail in the detailed description. However, specific embodiments disclosed in the accompanying drawings are just for making the various embodiments easily understood. Accordingly, the technical idea of the disclosure is not restricted by the specific embodiments disclosed in the accompanying drawings, and the embodiments should be understood as including all equivalents or alternatives included in the idea and the technical scope of the disclosure.

Also, terms including ordinal numbers such as 'the first' and 'the second' may be used to describe various components, but these components are not limited by the aforementioned terms. The aforementioned terms are used only for the purpose of distinguishing one component from another component.

In addition, in this specification, terms such as "include" and "have" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof. Also, the description in the disclosure that an element is "coupled with/to" or "connected to" another element should be interpreted to mean that the one element may be directly coupled with/to or connected to the another element, but still another element may exist between the elements. In contrast, the description that one element is "directly coupled" or "directly connected" to another element can be interpreted to mean that still another element does not exist between the one element and the another element.

Meanwhile, "a module" or "a part" for the elements used in this specification performs at least one function or operation. Also, "a module" or "a part" may perform a function or an operation by hardware, software, or a combination of hardware and software. Also, a plurality of "modules" or a plurality of "parts" except "a module" or "a part" that needs to be implemented in specific hardware or is performed in at least one processor may be integrated into at least one module. Further, singular expressions include plural expressions, unless defined obviously differently in the context.

Also, in the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Further, the description "A or B" in this specification is defined to include not only a case wherein one of A or B is selectively referred to, but also a case wherein both of A and B are included. In addition, the term "include" in this specification includes a case wherein elements other than elements listed as being included are further included.

Further, in this specification, elements not related to the essence of the disclosure are not mentioned. Also, the descriptions of the disclosure should not be interpreted to have an exclusive meaning of including only the elements mentioned, but to have a non-exclusive meaning of also including other elements.

Other than the above, in describing the disclosure, in case it is determined that detailed explanation of related known functions or features may unnecessarily confuse the gist of the disclosure, the detailed explanation will be abridged or omitted. Meanwhile, each embodiment may be independently implemented or operated, but the embodiment may also be implemented or operated in combination with another embodiment.

FIG. 1 is a diagram illustrating a home appliance system according to an embodiment of the disclosure.

Referring to FIG. 1, a home appliance system may include a home appliance 100 and a terminal device 200. For example, the home appliance 100 may include a kitchen hood, a cleaner, a mixer, a ventilator, a fan heater, an air conditioner, a refrigerator, a washing machine, a dryer, a dishwasher, an air dresser, a TV, a dryer, a fan, etc. Also, the terminal device 200 may include a smartphone, a tablet PC, a laptop computer, etc.

The home appliance 100 and the terminal device 200 may be communicatively connected. For example, the home appliance 100 and the terminal device 200 may be located inside a same home, and may be connected through communication methods such as Bluetooth, Wi-Fi, etc. A user may operate the home appliance 100 while placing the terminal device 200 in a different place. Also, the user may set the noise control mode of the home appliance 100 as an activation mode or an inactivation mode.

Based on the terminal device 200 receiving notification information from an external device, the terminal device 200 may perform a notifying operation, and simultaneously (or, sequentially) transmit the received notification information to the home appliance 100. For example, the terminal device 200 may transmit simple information that notification information was received to the home appliance 100, or transmit detailed notification information including the type of the notification information, the counterpart information, the content of the notification information, etc. to the home appliance 100. For example, the type of the notification information may include receipt of a phone call, receipt of a text message, receipt of a message from SNS or a chatting app, etc., receipt of data such as an e-mail, etc.

If the home appliance 100 receives notification information from the terminal device 200 while the noise control mode is set as the activation mode, the home appliance 100 may reduce the driving speed of the motor to reduce noise generated from the motor. Big noises during an operation of the home appliance 100 may mostly be noises by driving of the motor. Accordingly, if the home appliance 100 reduces the driving speed of the motor, the noise of the home appliance 100 may be reduced. As an example, the home appliance 100 may gradually reduce the driving speed of the motor. Also, the home appliance 100 may reduce the driving speed of the motor to a predetermined speed (for example, a minimum speed), or stop the driving of the motor.

Also, the home appliance 100 may output notification information based on specific notification information received from the terminal device 200. For example, the home appliance 100 may output notification information as a voice through a speaker, or output notification information as texts or an image through a display. Then, if a predetermined condition is satisfied after the driving speed of the motor was reduced, the home appliance 100 may increase the driving speed of the motor to the initial speed. For example, the predetermined condition may include passage of a predetermined time, completion of output of the notification information, receipt of information regarding task completion of the notification information from the terminal device, etc. As an example, if the terminal device 200 receives a text message which is "What are you doing now?" from a counterpart A, the terminal device 200 may transmit information related to the received text message to the home appliance 100. If the noise control mode of the home appliance 100 is in an activated state, the home appliance 100 may reduce the noise by controlling the driving of the motor. Then, the home appliance 100 may output notification information which is "A text message was received from A" or "A text message 'What are you doing now?' was received from A" through the speaker or an output interface of the display. Then, if a specific condition is satisfied, the home appliance 100 may increase the driving speed of the motor to the original speed.

According to an embodiment, the home appliance 100 may increase the driving speed of the motor based on output of notification information being completed. Alternatively, the home appliance 100 may increase the driving speed of the motor if a predetermined time passes at the home appliance 100. If the time set at the home appliance 100 is one minute, the home appliance 100 may increase the driving speed of the motor after one minute. For example, the starting point of counting the time set at the home appliance 100 may be the time point when the initial driving speed of the motor started to be reduced or the time point when output of the notification information was completed. That is, if the set time is one minute and the starting point of counting is the time point when the initial driving speed of the motor started to be reduced, the home appliance 100 may increase the driving speed of the motor after one minute from the time point when the driving speed of the motor was reduced. Alternatively, if the starting point of counting of the set time is the time point when output of the notification information was completed, the home appliance 100 may increase the driving speed of the motor one minute after the output of the notification information was completed. Alternatively, the home appliance 100 may increase the driving speed of the motor based on task completion information related to the notification information received from the terminal device 200 being received. For example, if the user recognizes that notification information was received from the terminal device 200, the user may perform tasks such as checking of the notification information, having a phone call with a counterpart, replying to a message, etc. through the terminal device 200. Here, the user may execute an app related to the notification information received from the terminal device 200 or an app performing a related task. Then, the user may finish the app based on the user checking the notification information or the related task was completed. Alternatively, the user may turn off the screen of the terminal device 200 or convert the state of the terminal device 200 to a standby mode state. The terminal device 200 may transmit information related to finishing of an app, turning off of the screen, conversion to the standby mode state, etc. to the home appliance 100. The aforementioned information related to finishing of an app, turning off of the screen, conversion to the standby mode state, etc. may be task completion information. Based on the home appliance 100 receiving task completion information from the terminal device 200, the home appliance 100 may increase the driving speed of the motor.

Alternatively, if the noise control mode is set as the inactivation mode, the home appliance 100 may not control the driving of the motor even if notification information is received from the terminal device 200. Accordingly, even if the terminal device 200 transmits unnecessary notification information such as a spam message, etc. to the home appliance 100, the user may perform a task using the home appliance 100 without being interrupted. However, even in case the noise control mode is set as the inactivation mode, the home appliance 100 may exceptionally control the driving of the motor. The user may set exceptional notification information (e.g., priority notification information, important information) at the terminal device 200. For example, in the phone number data stored in the terminal device 200, a specific counterpart or a specific group (e.g., a group of counterparts) may be set as exceptional notification information by the user. Alternatively, safety messages, emergency calls, contact information input by the user, etc. may be set as exceptional notification information. Then, the user may set the noise control mode of the home appliance 100 as an inactivated state.

If the terminal device 200 receives general notification information, the terminal device 200 may transmit the notification information to the home appliance 100 without the predetermined indicator. As the noise control mode is in the inactivated state and the received notification information does not include the predetermined indicator, the home appliance 100 may ignore the received notification information and maintain the driving speed of the motor at an initial speed. If the terminal device 200 receives notification information belonging to the set exceptions, the terminal device 200 may include the predetermined indicator in the notification information and transmit the predetermined indicator to the home appliance 100. Even though the noise control mode is in the inactivated state, as the predetermined indicator is included in the received notification information, the home appliance 100 may control the driving speed of the motor in a similar manner to what was described above. For example, the predetermined indicator may be an indicator indicating notification information received from a specific counterpart or a specific group, etc. that the user set at the terminal device 200, safety messages, emergency calls, etc.

According to an embodiment, the home appliance 100 may be a cleaner, and the terminal device 200 may be a smartphone. The user may place the smartphone on a table located in a room, and clean the living room by using the cleaner. The cleaner may perform a cleaning function by a method of suctioning the air and dust by using the motor. As the cleaner drives the motor at a high speed to suction the air and dust, a substantial noise may be generated. Here, if the smartphone receives a phone call or a message, it may be difficult for the user to recognize receipt of the phone call or the message due to the noise of the cleaner.

The cleaner may perform a noise controlling function. The cleaner may receive instructions for activation/inactivation of the noise control mode through a button, a keypad, a touch pad, a touch screen, etc. Also, the cleaner may be interlocked with the smartphone of the user. If the cleaner receives an instruction for activation of the noise control mode from the user, the cleaner may activate (turn on) the noise control model, and perform the noise controlling function. Based on the smartphone interlocked with the cleaner receiving a phone call or a message, etc., the smartphone may transmit notification information to the cleaner. For example, the notification information may be simple information that a notification was received, or the notification information may include detailed notification information including the type of the notification information, the counterpart information, the content of the notification information, etc. As an example, the smartphone may transmit notification information to the cleaner by a broadcasting method.

The cleaner may receive the notification information transmitted from the smartphone. If the noise control mode of the cleaner is in an activated state, the cleaner may reduce the driving speed of the motor to reduce noise generated from the motor. Also, the cleaner may output the notification information as a voice through the speaker, or output the notification information as texts or images through the display. The user may recognize that a phone call or a message, etc. were received at the smartphone as the noise was reduced because the motor driving speed of the cleaner was reduced or through the notification information output from the cleaner. Also, if a specific condition is satisfied after the driving speed of the motor was reduced, the cleaner may increase the driving speed of the motor to the initial speed. For example, the specific condition may include passage of a predetermined time, completion of output of the notification information, receipt of information regarding task completion of the notification information from the smartphone, etc.

Alternatively, the cleaner may inactivate the noise control mode. A message or a phone call, etc. received at the smartphone of the user may include information (for example, necessary information), but the received information may include unnecessary information such as spams, advertisements, etc. Alternatively, the user may not want to receive a message or a phone call, etc. to concentrate on the cleaning task. The user may input an instruction for inactivating the noise control mode through the input interface of the cleaner. The cleaner may inactivate (turn off) the noise control mode based on the input instruction for inactivation of the noise control mode. Based on the noise control mode being inactivated, the cleaner may ignore the notification information received from the interlocked smartphone, and maintain the driving speed of the motor.

Alternatively, the user may want to receive a notification for some important information. The user may set exceptional notification information at the smartphone. For example, the smartphone may set information of a specific counterpart or a specific group as exceptional notification information according to an instruction of the user. For example, the smartphone may set a specific counterpart such as a friend A or a specific group such as a family group as exceptional notification information according to an instruction of the user. Alternatively, the smartphone may set safety messages, emergency calls, etc. as exceptional notification information. For example, the smartphone may receive a phone call from the friend A or the son included in the family group corresponding to the exceptional information. Alternatively, the smartphone may receive a safety message.

Based on the smartphone receiving a phone call of the friend A or the son or a safety message corresponding to the exceptional information, the smartphone may transmit the received notification information together with an indicator indicating that the notification is a notification received from a counterpart corresponding to the exceptional information to the cleaner. The cleaner may receive the indicator together with the notification information. Even if the noise control mode is in an inactivated state, based on the cleaner receiving the indicator from the smartphone, the cleaner may reduce the driving speed of the motor to reduce the noise. Even though the noise control mode is in an inactivated state, the user may recognize that a phone call from the friend A or the son or a safety message set as the exceptional information (important information) was received.

So far, the home appliance system was described. Hereinafter, the configurations of the home appliance 100 and the terminal device 200 will be described.

Figure 2:
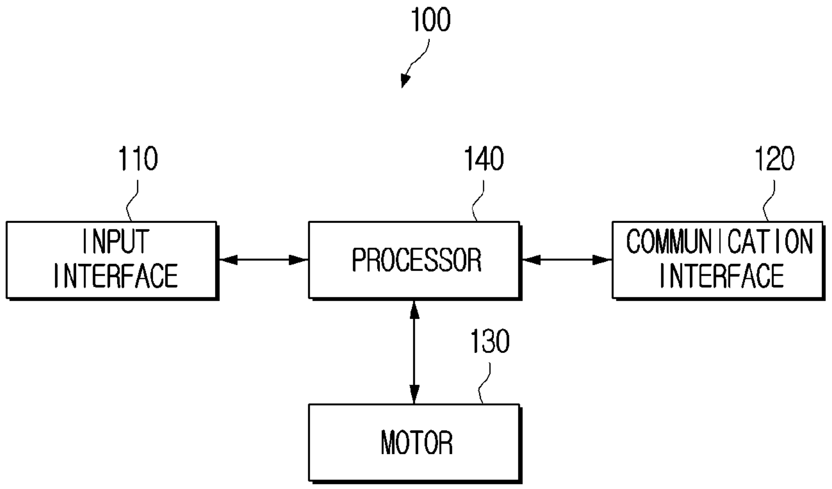
FIG. 2 is a block diagram of a home appliance according to an embodiment of the disclosure.

FIG. 2 is a block diagram of a home appliance according to an embodiment of the disclosure.

Referring to FIG. 2, the home appliance 100 may include an input interface 110, a communication interface 120, a motor 130, and a processor 140.

The input interface 110 may receive input of a control instruction, etc. from the user. Then, the input interface 110 may receive input of an instruction selecting whether to activate the noise control mode from the user. For example, the input interface 110 may include a keyboard, a button, a keypad, a touch pad, a touch screen, etc. The input interface 110 may also be referred to as an input device, an input part, an input module, etc.

The communication interface 120 may perform communication with an external device. For example, the communication interface 120 may perform communication with an external device by at least one communication method among communication methods of Wi-Fi, Wi-Fi Direct, Bluetooth, Zigbee, 3rd Generation (3G), 3rd Generation Partnership Project (3GPP), and Long Term Evolution (LTE). The communication interface 120 may receive notification information from the terminal device 200. For example, the notification information may be information notifying receipt of a phone call, receipt of a text message, receipt of a message from SNS or a chatting app, etc., receipt of data such as an e-mail, etc. The aforementioned communication interface 120 may also be referred to as a communication device, a communication part, a communication module, a transceiver, etc.

The motor 130 may drive the driving part of the home appliance 100. For example, if the home appliance 100 is a kitchen hood, the motor 130 may drive the suction part to suction odor, smoke, etc. that are generated during cooking. Alternatively, if the home appliance 100 is a cleaner, the motor 130 may drive the suction part to suction dust, foreign substances, etc. Alternatively, if the home appliance 100 is a mixer, the motor 130 may drive the driving part to grind food ingredients.

The processor 140 may control each component of the home appliance 100. For example, the processor 140 may control the input interface 110 to receive input of an instruction regarding whether to activate the noise control mode from the user, control the communication interface 120 to receive notification information from the terminal device 200, and control the motor 130 to drive the driving part.

If notification information is received from the terminal device 200 and the noise control mode of the home appliance 100 is in an activated state, the processor 140 may reduce the driving speed of the motor to reduce noise generated from the motor 130. For example, the processor 140 may gradually control the driving speed of the motor 130 according to time to gradually reduce the noise. For example, the processor 140 may control the driving speed of the motor 130 to gradually reduce the size of the noise linearly or by a log scale. Alternatively, the processor 140 may control the driving speed of the motor 130 linearly or by a time interval of a log scale.

Also, if the noise control mode of the home appliance 100 is in an inactivated state, the processor 140 may reduce the driving speed of the motor 130 to reduce noise generated from the motor 130 under a specific condition. For example, the processor 140 may identify whether a predetermined indicator is included in the notification information. If a predetermined indicator is included in the notification information, the processor 140 may reduce the driving speed of the motor 130 even if the noise control mode is in an inactivated state. For example, the predetermined indicator may be an indicator indicating notification information received from a specific counterpart or a specific group, etc. that the user set at the terminal device 200, safety messages, emergency calls, etc.

Figure 3:
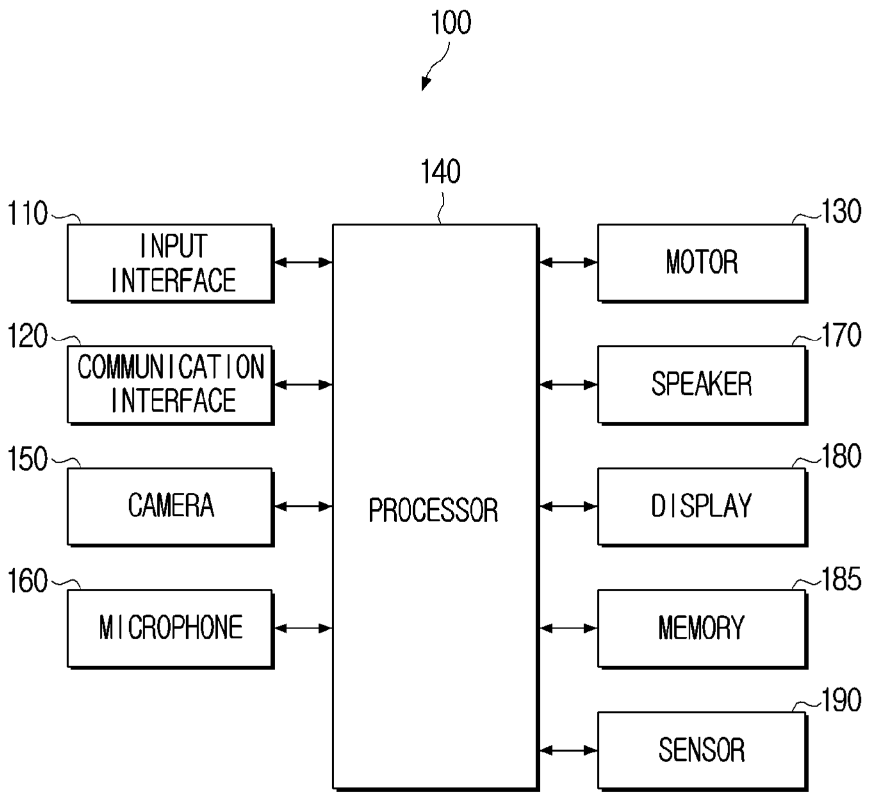
FIG. 3 is a detailed block diagram of a home appliance according to an embodiment of the disclosure.

FIG. 3 is a detailed block diagram of a home appliance according to an embodiment of the disclosure.

Referring to FIG. 3, the home appliance 100 may include an input interface 110, a communication interface 120, a motor 130, a processor 140, a camera 150, a microphone 160, a speaker 170, a display 180, a memory 185, a sensor 190, etc. As the input interface 110, the communication interface 120, and the motor 130 are identical to what was explained in FIG. 2, detailed explanation will be omitted.

The camera 150 may photograph the ambient environment of the home appliance 100. Alternatively, the camera 150 may photograph the user's facial expression, the user's operation, or the user's gaze, etc. The processor 140 may recognize a control instruction or a reading/viewing area based on the user's facial expression, the user's operation, or the user's gaze, etc. that was photographed, and perform a control operation corresponding to the recognized control instruction or the recognized area. For example, the camera 150 may include a CCD sensor and a CMOS sensor. Also, the camera 150 may include an RGB camera and a depth camera.

The microphone 160 may receive input of the user's voice. The processor 140 may recognize a control instruction based on the input voice, and perform a control operation corresponding to the recognized control instruction.

The speaker 170 outputs a sound signal for which sound signal processing was performed. For example, the speaker 170 may output notification information received from the terminal device 200 as a voice. Also, the speaker 170 may output an input instruction of the user, information related to the state of the home appliance 100, or information related to an operation, etc. as a voice or a notification sound.

The display 180 may display information by a visual method. For example, the display 180 may output notification information received from the terminal device 200 as texts or an image. For example, the display 180 may be implemented as a liquid crystal display (LCD), organic light emitting diodes (OLED), a touch screen, etc. In case the display 180 is implemented as a touch screen, the home appliance 100 may receive input of a control instruction through the touch screen. The aforementioned speaker 170 and display 180 may also be referred to as an output interface. That is, the home appliance 100 may output notification information received from the terminal device 200 through an output interface.

The memory 185 may store data, an algorithm, etc. that perform the functions of the home appliance 100, and store programs, instructions, etc. driven at the home appliance 100. The algorithm stored in the memory 185 may be loaded on the processor 140 by control of the processor 140, and perform a data processing process. For example, the memory 185 may be implemented as types such as a ROM, a RAM, an HDD, an SSD, a memory card, etc.

The sensor 190 may detect information related to the user or the ambient environment. The processor 140 may perform a control operation based on the detected information. For example, the sensor 190 may include an image sensor, a tracking sensor, an angle sensor, an acceleration sensor, a gravity sensor, a gyro sensor, a geomagnetic sensor, a direction sensor, a motion recognition sensor, a proximity sensor, a voltmeter, an ammeter, a barometer, a hygrometer, a thermometer, an illumination sensor, a heat detection sensor, a touch sensor, an infrared sensor, an ultrasonic sensor, etc.

The home appliance 100 may include all of the aforementioned components, or include some components. Also, the home appliance 100 may further include other components that perform various functions other than the aforementioned components.

Figure 4:
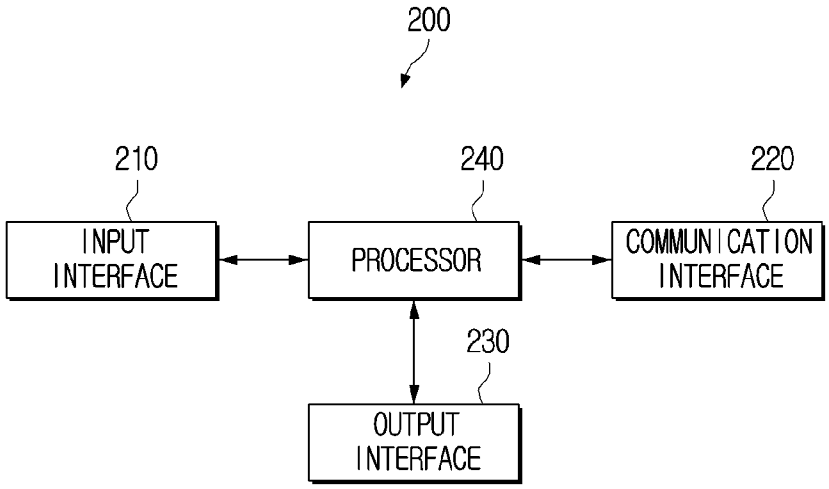
FIG. 4 is a block diagram of a terminal device according to an embodiment of the disclosure.

FIG. 4 is a block diagram of a terminal device according to an embodiment of the disclosure.

Referring to FIG. 4, the terminal device 200 may include an input interface 210, a communication interface 220, an output interface 230, and a processor 240.

The input interface 210 may receive input of a control instruction, etc. from the user. Then, the input interface 210 may receive input of selection of a subject for exceptional notification. As an example, the input interface 210 may receive selection of a specific counterpart or a specific group stored in the phone number data from the user. Alternatively, the input interface 210 may receive selection of contact information input by the user, safety messages, emergency calls, etc. as subjects for exceptional notification. As described above, the terminal device 200 may include a predetermined indicator in the notification information received from a subject for exceptional notification, and transmit the predetermined indicator to the home appliance 100. Then, the home appliance 100 that received the notification information including the predetermined indicator may perform a noise control operation even based on the noise control mode being in an inactivated state. For example, the input interface 210 may include a keyboard, a button, a keypad, a touch pad, a touch screen, etc. The input interface 210 may also be referred to as an input device, an input part, an input module, etc.

The communication interface 220 may perform communication with an external device. For example, the communication interface 220 may perform communication with an external device by at least one communication method among communication methods of Wi-Fi, Wi-Fi Direct, Bluetooth, Zigbee, 3rd Generation (3G), 3rd Generation Partnership Project (3GPP), and Long Term Evolution (LTE). The external device may include a server, a cloud, a terminal device of a counterpart, the home appliance 100, etc. The communication interface 220 may receive notification information from the server, the cloud, the terminal device of the counterpart, etc. For example, the notification information may include receipt of a phone call, receipt of a text message, receipt of a message from SNS or a chatting app, etc., receipt of data such as an e-mail, etc. Based on the terminal device 200 receiving the notification information from the external device, the communication interface 220 may transmit the received notification information to the home appliance 100. The aforementioned communication interface 220 may also be referred to as a communication device, a communication part, a communication module, a transceiver, etc.

The output interface 230 may include a speaker and a display, etc. For example, in case the output interface 230 is implemented as a speaker, the output interface 230 may output a sound signal for which sound signal processing was performed. In case the output interface 230 is implemented as a display, the output interface 230 may output information by a visual method. For example, the display may be implemented as a liquid crystal display (LCD), organic light emitting diodes (OLED), a touch screen, etc. In case the display is implemented as a touch screen, the terminal device 200 may receive input of a control instruction through the touch screen.

The processor 240 may control each component of the terminal device 200. For example, the processor 240 may control the input interface 210 to receive input of an instruction selecting a subject for exceptional notification, control the communication interface 120 to transmit and receive information with an external device, and control the output interface 230 to output information.

Also, in a similar manner to what was explained in FIG. 3, the terminal device 200 may further include components such as a camera, a microphone, a memory, a sensor, etc. For example, the memory of the terminal device 200 may store contact information of counterparts, and store information on user-selected subjects for exceptional notification.

So far, the configurations of the home appliance 100 and the terminal device 200 were described. Hereinafter, a method for the home appliance 100 to control motor driving will be described.

Figure 5A:
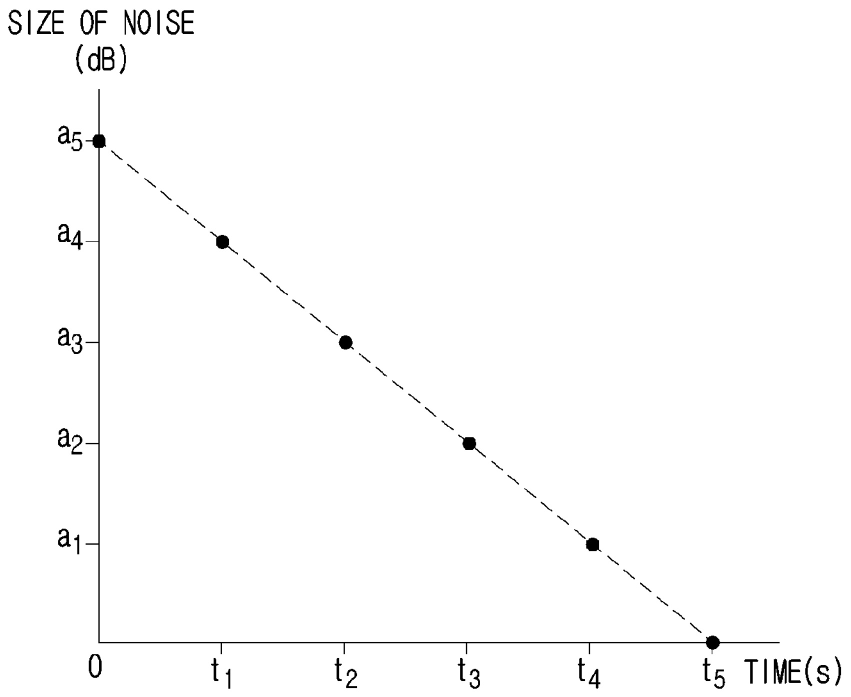
FIG. 5A and FIG. 5B are diagrams illustrating a method of reducing noise through control of motor driving according to an embodiment of the disclosure.
Figure 5B:
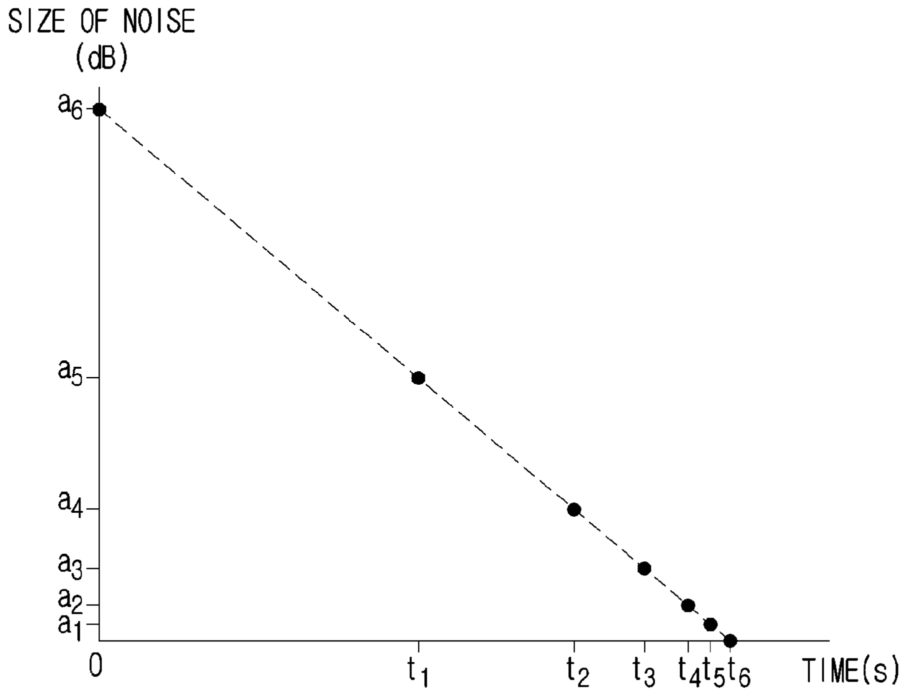

FIG. 5A and FIG. 5B are diagrams illustrating a method of reducing noise through control of motor driving according to an embodiment of the disclosure.

Referring to FIG. 5A, a graph of gradually reducing noise by controlling the driving of the motor by a specific time interval is illustrated. For example, noise of a5 dB may be generated based on the home appliance 100 being driven. The home appliance 100 may reduce the driving speed of the motor by a specific time interval from 0 to t5 time, and reduce the noise generated from the home appliance 100 to 0 dB. The feature of reducing the noise generated from the home appliance 100 to 0 dB may mean stopping the driving of the motor. Alternatively, the home appliance 100 may reduce the driving speed of the motor by a specific time interval from 0 to t4 time, and reduce the noise generated from the home appliance 100 to a1 dB. For example, the home appliance 100 may store a table regarding the size of noise corresponding to the driving speed of the motor. The home appliance 100 may control the corresponding driving speed of the motor by a specific time interval such that the size of the noise is reduced by a specific size based on the stored table.

According to an embodiment, if the noise generated from the home appliance 100 is 100 dB, the home appliance 100 may control the driving speed of the motor such that the noise is reduced to 80 dB after two seconds based on the time point based on the initial noise control starting, to 60 dB after four seconds, to 40 dB after six seconds, to 20 dB after eight seconds, and to 0 dB after 10 seconds.

Referring to FIG. 5B, a graph of gradually reducing noise by reducing the driving speed of the motor by a time interval of a log scale is illustrated. For example, noise of a6 dB may be generated based on the home appliance 100 being driven. The home appliance 100 may reduce the driving speed of the motor by a time interval of a log scale from 0 to t6 time, and reduce the noise generated from the home appliance 100 to 0 dB. Alternatively, the home appliance 100 may reduce the driving speed of the motor by a time interval of a log scale from 0 to t5 time, and reduce the noise generated from the home appliance 100 to a1 dB.

According to an embodiment, if the noise generated from the home appliance 100 is 96 dB, the home appliance 100 may control the driving speed of the motor such that the noise is reduced to 48 dB after 4.8 seconds based on the time point based on the initial noise control starting, to 24 dB after 7.2 seconds, to 12 dB after 8.4 seconds, to 6 dB after 9 seconds, to 3 dB after 9.3 seconds, and to 0 dB after 9.45 seconds.

Alternatively, the home appliance 100 may control the driving of the motor to decelerate by a specific time interval such that the noise is reduced by a size of a log scale, or control the driving of the motor to decelerate by a time interval of a log scale such that the noise is reduced by a specific size.

So far, various embodiments of reducing noise generated from the home appliance 100 were described. Hereinafter, a controlling method of the home appliance 100 will be described.

Figure 6:
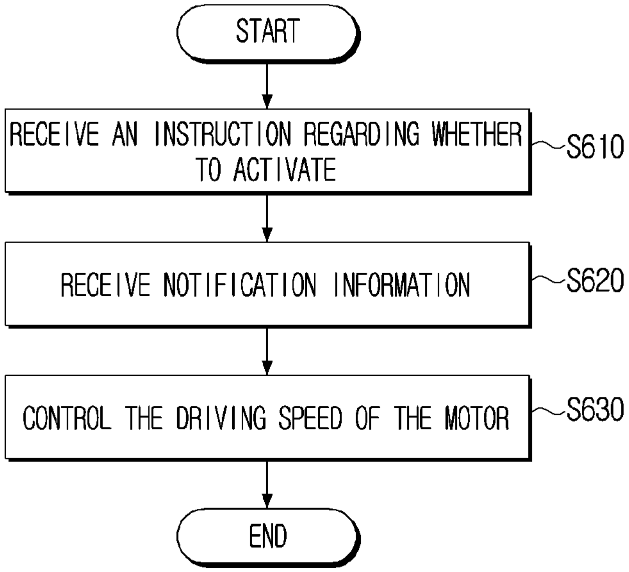
FIG. 6 is a flow chart illustrating a controlling method of a home appliance according to an embodiment of the disclosure.

FIG. 6 is a flow chart illustrating a controlling method of a home appliance according to an embodiment of the disclosure.

Referring to FIG. 6, the home appliance may receive input of an instruction regarding whether to activate the noise control mode from the user in operation S610. Then, the home appliance may receive notification information from an interlocked terminal device in operation S620. For example, the notification information may include receipt of a phone call, receipt of a text message, receipt of a message from SNS or a chatting app, etc., receipt of data such as an e-mail, etc.

The home appliance may control the driving speed of the motor based on a set noise control mode in operation S630. If the noise control mode is in an activated state, the home appliance may reduce the driving speed of the motor to reduce noise generated from the motor. For example, the home appliance may gradually control the driving speed of the motor according to time to gradually reduce the noise. The home appliance may control the driving speed of the motor to gradually reduce the size of the noise by a log scale. Alternatively, the home appliance may control the driving speed of the motor linearly or by a time interval of a log scale. The home appliance may store a table regarding the size of the noise corresponding to the driving speed of the motor, and control the driving speed of the motor to decelerate based on the stored table. If the noise control mode is in an inactivated state, the home appliance may ignore the notification information and maintain the driving speed of the motor.

Meanwhile, in the notification information that the home appliance receives from the terminal device, a predetermined indicator may be included. For example, the predetermined indicator may be an indicator indicating notification information received from a specific counterpart or a specific group, etc. that the user set at the terminal device, safety messages, emergency calls, etc. If the notification information received from the terminal device includes the predetermined indicator, the home appliance may reduce the driving speed of the motor even if the noise control mode is in an inactivated state.

Also, the home appliance may output the received notification information. For example, the home appliance may output notification information as a voice through the speaker, or output notification information by a visual method through the display.

If a predetermined condition is satisfied after reducing the driving speed of the motor, the home appliance may increase the driving speed of the motor. For example, the predetermined condition may include passage of a predetermined time, completion of output of the notification information, receipt of task completion information related to the received notification information, etc.

Figure 7:
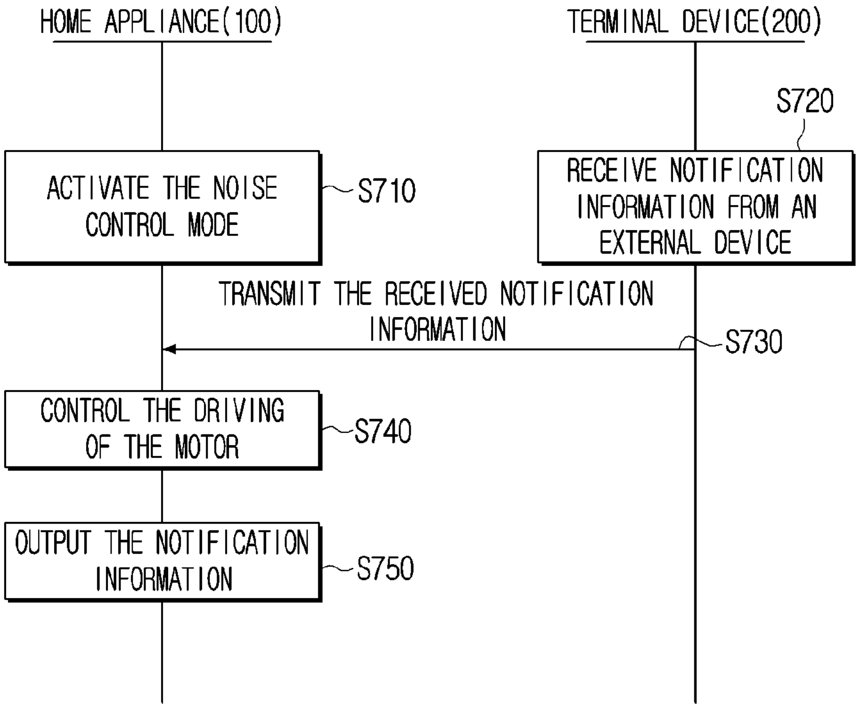
FIG. 7 is a timing diagram illustrating a controlling method of a home appliance wherein a noise control mode is in an activated state according to an embodiment of the disclosure.

FIG. 7 is a timing diagram illustrating a controlling method of a home appliance wherein a noise control mode is in an activated state according to an embodiment of the disclosure.

Referring to FIG. 7, the home appliance 100 may receive input of a selection instruction activating the noise control mode from the user in operation S710. The terminal device 200 may receive notification information from an external device in operation S720.

The terminal device 200 may transmit the received notification information to the home appliance 100 in operation S730. The terminal device 200 may perform a notifying operation by itself, separately from the operation of transmitting the received notification information to the home appliance 100. As an example, if the terminal device 200 receives a phone call from a counterpart, the terminal device 200 may transmit notification information regarding the received phone call to the home appliance 100, and output a notification bell or vibration regarding the received phone call.

The home appliance may control the driving of the motor to reduce the generated noise in operation S740. For example, the home appliance may reduce the driving speed of the motor by a specific time interval or a time interval of a log scale. The home appliance may reduce the driving speed of the motor such that noise of a predetermined size is generated. The predetermined size may be set as a specific size or a size of a log scale. The home appliance may store a relation table between the driving speed of the motor and the generated noise, and control the driving speed of the motor based on the stored table.

Then, the home appliance may output the notification information in operation S750. For example, the notification information may include the type of the notification information, the counterpart information, the content of the notification information, etc. The home appliance may output the notification information as a voice through the speaker, or output the notification information as an image or texts through the display.

Also, if a predetermined condition is satisfied after reducing the driving speed of the motor, the home appliance may increase the driving speed of the motor to the initial driving speed. For example, the predetermined condition may include conditions such as passage of a predetermined time, completion of output of the notification information, receipt of task completion information related to the received notification information, etc.

Figure 8:
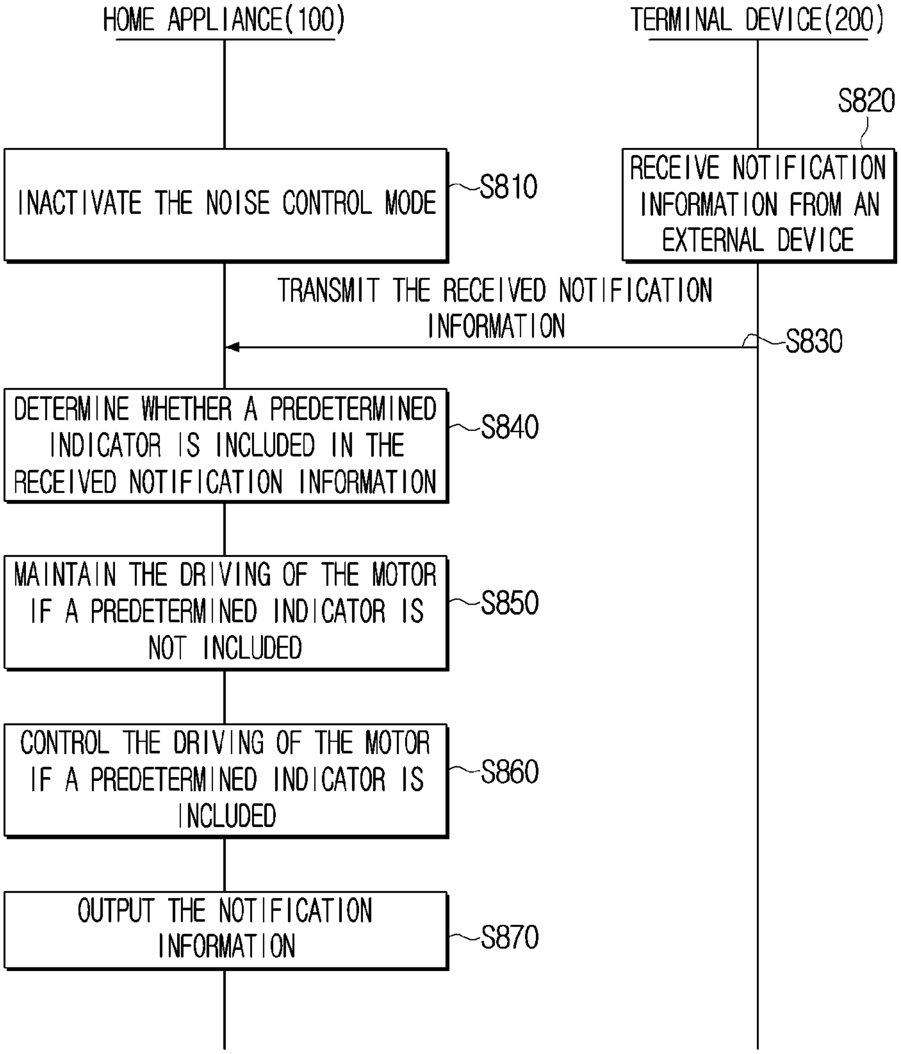
FIG. 8 is a timing diagram illustrating a controlling method of a home appliance wherein a noise control mode is in an inactivated state according to an embodiment of the disclosure.

FIG. 8 is a timing diagram illustrating a controlling method of a home appliance wherein a noise control mode is in an inactivated state according to an embodiment of the disclosure.

Referring to FIG. 8, the home appliance 100 may receive input of a selection instruction inactivating the noise control mode from the user in operation S810. The terminal device 200 may receive notification information from an external device in operation S820, and transmit the received notification information to the home appliance 100 in operation S830.

As described above, the user may set exceptional notification information (e.g., priority notification information, important information) at the terminal device 200. For example, the exceptional notification information may include a specific counterpart or a specific group in the phone number data stored in the terminal device 200, safety messages, emergency calls, contact information input by the user, etc. Based on the terminal device 200 receiving notification information included in the exceptional notification information, the terminal device 200 may include a predetermined indicator in the notification information and transmit the predetermined indicator to the home appliance 100.

The home appliance may determine whether a predetermined indicator is included in the received notification information in operation S840. If the predetermined indicator is not included in the notification information, the home appliance may ignore the notification information and maintain the driving of the motor in operation S850. If the predetermined indicator is included in the notification information, the home appliance may control the driving of the motor to decelerate to reduce the generated noise in operation S860.

The home appliance may output the notification information in operation S870. As the processes after the home appliance output the notification information are the same as what was explained in FIG. 7, detailed explanation in that regard will be omitted.

The controlling method of a home appliance according to the aforementioned various embodiments may be provided as a computer program product. The computer program product may include an S/W program itself, or a non-transitory computer readable medium storing an S/W program.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disc, a blue-ray disc, a USB, a memory card, a ROM, and the like.

Also, while preferred embodiments of the disclosure have been shown and described, the disclosure is not limited to the aforementioned specific embodiments, and various modifications may be made without departing from the gist of the disclosure and the appended claims. Further, it is intended that such modifications are not to be interpreted independently from the technical idea or prospect of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A home appliance comprising:

an input interface;

a communication interface;

a processor; and a motor, wherein the processor is configured to:

receive, through the input interface, user input of an instruction regarding whether to activate a noise control mode;

receive, from a terminal device interlocked with the home appliance, notification information including at least one of a received call or a received message, the notification information received through the communication interface; and based on the noise control mode being in an inactivated state, determine whether to ignore the notification information and maintain a driving speed of the motor.

2. The home appliance of claim 1, wherein the processor is configured to:

determine whether to ignore the notification information based on the noise control mode being in the inactivated state and based on whether a predetermined indicator is included in the received notification information; and based on the notification information including the predetermined indicator, determine to reduce the driving speed of the motor even though the noise control mode is in the inactivated state.

3. The home appliance of claim 2, wherein the predetermined indicator indicates a notification received from a counterpart corresponding to information of counterparts, and wherein the information of counterparts is set as exceptional information in the terminal device or the counterpart is included in a group that is set as the exceptional information.

4. The home appliance of claim 2, wherein the processor is configured to:

based on a predetermined condition being satisfied after reducing the driving speed of the motor, increase the driving speed of the motor.

5. The home appliance of claim 4, wherein the predetermined condition comprises:

at least one condition among passage of a predetermined time, completion of output of the notification information, or receipt of task completion information related to the received notification information.

6. The home appliance of claim 2, wherein the processor is configured to:

control the driving speed of the motor by a specific time interval to reduce noise generated by the motor.

7. The home appliance of claim 6, wherein the processor is configured to:

control the driving speed of the motor by a specific time interval to reduce a size of the noise by a log scale.

8. The home appliance of claim 7, wherein the processor is configured to:

control the driving speed of the motor linearly or by a time interval of a log scale.

9. The home appliance of claim 2, further comprising:

an output interface, wherein the processor is configured to:

based on the notification information including a predetermined indicator, control the output interface to output the received notification information.

10. The home appliance of claim 1, wherein the processor is configured to:

based on the noise control mode being in the inactivated state, determine whether a predetermined indicator is included in the received notification information; and based on the notification information not including the predetermined indicator, determine to ignore the notification information and maintain a driving speed of the motor.

11. A controlling method of a home appliance, the method comprising:

receiving, from a user, input of an instruction to inactivate a noise control mode of the home appliance;

placing the noise control mode in an inactivated state based on the input;

receiving, from a terminal device interlocked with the home appliance, notification information including at least one of a received call or a received message; and based on the noise control mode being in the inactivated state:

ignoring the notification information based on the notification information; and controlling a motor speed of a motor of the home appliance by maintaining a driving speed of the motor.

12. The controlling method of the home appliance of claim 11, wherein:

receiving a second notification information including at least one of a received call or a received message; wherein a predetermined indicator is included in the second notification information; and reducing the driving speed of the motor even though the noise control mode is in the inactivated state based on the second notification information.

13. The controlling method of the home appliance of claim 12, wherein the predetermined indicator indicates a notification received from a counterpart corresponding to information of counterparts, and wherein the information of counterparts is set as exceptional information in the terminal device or the counterpart is included in a group that is set as exceptional information.

14. The controlling method of the home appliance of claim 12, further comprising:

based on a predetermined condition being satisfied after reducing the driving speed of the motor, increasing the driving speed of the motor.

15. The controlling method of the home appliance of claim 14, wherein the predetermined condition comprises:

at least one condition among passage of a predetermined time, completion of output of the notification information, or receipt of task completion information related to the received notification information.

16. The controlling method of the home appliance of claim 12, wherein controlling the motor speed comprises:

reducing the driving speed of the motor by a specific time interval to reduce noise generated by the motor.

17. The controlling method of the home appliance of claim 16, further comprising:

controlling the driving speed of the motor by a specific time interval to reduce a size of the noise by a log scale.

18. The controlling method of the home appliance of claim 17, further comprising:

controlling the driving speed of the motor linearly or by a time interval of a log scale.

19. The controlling method of a home appliance of claim 12, further comprising:

based on the notification information including a predetermined indicator, controlling an output interface of the home appliance to output the received notification information.

20. The controlling method of the home appliance of claim 11, wherein:

ignoring the notification information comprises ignoring the notification information based on the notification information not including a predetermined indicator; and controlling the motor speed comprises maintaining the driving speed of the motor based on based on the notification information not including the predetermined indicator.

* * * * *